(12) United States Patent
Yamada

(10) Patent No.: US 6,416,575 B2
(45) Date of Patent: Jul. 9, 2002

(54) PHOTONIC CRYSTAL MULTILAYER SUBSTRATE AND MANUFACTURING METHOD THEREOF

(75) Inventor: Hirohito Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/893,003

(22) Filed: Jun. 28, 2001

(30) Foreign Application Priority Data

Jul. 5, 2000 (JP) ........................................ 2000-204198

(51) Int. Cl.⁷ ................................................ C30B 25/02
(52) U.S. Cl. ................................................ 117/2; 117/1
(58) Field of Search .......................................... 117/1, 2

(56) References Cited

FOREIGN PATENT DOCUMENTS

| JP | 10-335758 | 12/1998 |
| JP | 11-218627 | 8/1999 |
| JP | 11-316154 | 11/1999 |
| JP | 11-330619 | 11/1999 |
| JP | 2000-56146 | 2/2000 |

*Primary Examiner*—Felisa Hiteshew
(74) *Attorney, Agent, or Firm*—Sughrue Mion, PLLC

(57) ABSTRACT

A lightwave circuit, by which the degree of integration can be further improved by employing a multilayered structure of wiring, is disclosed. The disclosed photonic crystal multilayer substrate has portions, each portion having a slab-waveguide type photonic crystal structure, multilayered in the direction of the thickness of the substrate. In the photonic crystal structure, a photonic crystal layer is disposed between cladding layers; the photonic crystal layer is made of a photonic crystal having a two or three dimensional periodically modulated structure with respect to the effective refractive index in the order of optical wavelengths; and each cladding layer is made of a material whose effective refractive index differs from the effective refractive index of the photonic crystal layer.

16 Claims, 6 Drawing Sheets

PHOTONIC CRYSTAL MULTILAYER SUBSTRATE AND MANUFACTURING METHOD THEREOF

BACKGROUND OF THE INVENTION

1. Field of the Invention

The present invention relates to a photonic crystal multilayer substrate, and in particular, to a structure of a micro lightwave circuit using a photonic crystal, a relevant multilayered structure, and a structure for realizing interlayered optical wiring, and to manufacturing methods thereof.

2. Description of the Related Art

Recently, photonic crystals functioning with two or three dimensional periodic structures with respect to the effective refractive index in the order of optical wavelengths have become the focus of attention. The size of the existing lightwave circuits (or optical circuits) may be reduced using such a photonic crystal by three or more orders of magnitude; therefore, application to micro lightwave circuits in optical communication or the like is anticipated.

In a photonic crystal, a photonic band gap for prohibiting the transmission of lightwaves with specific wavelength can be generated. If a linear defect is introduced in a photonic crystal having such a photonic band gap, lightwaves can be completely confined in the linear defect, and additionally, this photonic crystal can be used as an optical waveguide in which light is transmitted along the linear defect.

Such a photonic crystal optical waveguide may include a sharply bent portion, thereby improving the flexibility of the design of the pattern of the relevant lightwave circuit, and decreasing the size of the lightwave circuit.

In recent tests, various optical devices such as optical waveguides and the like were formed in a photonic crystal, thereby forming micro lightwave circuits.

However, the conventional photonic crystal lightwave circuits have some problems.

First, in the concept of the conventional lightwave circuits, the circuit is formed in a single plane. Therefore, even if the flexibility of the circuit pattern can be improved by employing sharply bent portions of optical wiring in the circuit by using a photonic crystal, the possible degree of integration is considerably limited.

Therefore, similarly to the multilayered structures in electronic integrated circuits on Si substrates, multilayered structures of optical wiring in lightwave circuits have been examined so as to improve the degree of integration. However, multilayered structures of optical wiring (i.e., optical waveguides) could not be easily realized, in comparison with the case of the multilayered structures in electronic integrated circuits.

The reason for this is that in optical wiring (i.e., optical waveguides), the mechanism for confining lightwaves in the optical waveguide is not as powerful in comparison with the confinement of electric current in electric wiring. Therefore, when two optical waveguides are positioned close to each other, interference (i.e., crosstalk) is generated between them. In addition, optical confinement of lightwaves is also insufficient at sharply bent portions; thus, lightwave signals may leak at such bent portions of the optical waveguide.

Furthermore, the scale of the lightwave circuit which can be formed in a single layer obviously has a limit; therefore, multilayered structures of the lightwave circuit have been strongly required. However, no concrete multilayered structure applied to the lightwave circuit and relevant manufacturing method have yet been proposed.

SUMMARY OF THE INVENTION

In consideration of the above circumstances, an object of the present invention is to solve the above-explained problems relating to the conventional lightwave circuits and to provide a lightwave circuit by which the degree of integration can be further improved by employing a multilayered structure of wiring, similar to that in electronic integrated circuits.

Therefore, the present invention provides a photonic crystal multilayer substrate having portions, each portion having a slab-waveguide type photonic crystal structure, multilayered in the direction of the thickness of the substrate, wherein in the slab-waveguide type photonic crystal structure:

a photonic crystal layer is disposed between cladding layers;

the photonic crystal layer is made of a photonic crystal having a two or three dimensional periodically modulated structure with respect to the effective refractive index in the order of optical wavelengths; and each cladding layer is made of a material whose effective refractive index differs from the effective refractive index of the photonic crystal layer.

Preferably, the effective refractive index of the material of each cladding layer is smaller than an effective refractive index of the photonic crystal layer. For example, each cladding layer is made of a one or two dimensional photonic crystal, so that a slab-type optical waveguide can be formed, and such slab-type optical waveguides can be multiply layered, thereby considerably improving the degree of integration of optical integrated circuits.

In the above structure, a multilayered lightwave circuit can be formed by forming optical devices, such as optical waveguides, optical coupling-splitting circuits, optical-wavelength filters, light emitting elements, light receiving elements, or the like, in the photonic crystal layers.

In the above structure, each cladding layer may have a multilayered film in which two or more kinds of materials having different effective refractive indexes are alternately layered.

In addition, each cladding layer may be made of a photonic crystal having a two or three dimensional periodically modulated structure with respect to the effective refractive index.

Preferably, the multilayered film or the photonic crystal for forming the cladding layer has high optical reflectivity for the wavelengths at which the lightwave circuit is operated.

The above structure may include a base layer on which the portions having the slab-waveguide type photonic crystal structure are formed;

optical devices formed in at least two layers among the base layer and the photonic crystal layers; and a mechanism for transmitting and receiving an optical signal between the optical devices of each layer.

It is possible that:

an optical device is formed in one of the base layer and the photonic crystal layers, and an optical waveguide is formed in the circuit plane of the optical device; and the mechanism for transmitting and receiving an optical signal between the optical devices is a mode converter for converting a lightwave in a manner such that a lightwave, which is transmitted along the optical waveguide, is radiated in the direction significantly perpendicular to the circuit plane, or a lightwave incident on the circuit plane in the direction significantly perpendicular to the circuit plane is transmitted along the optical waveguide.

The mode converter may have an optical resonance mechanism, formed at an end portion of the optical waveguide in the circuit plane of the optical device, by which resonance for a lightwave with a certain wavelength transmitted through the optical waveguide occurs, and the lightwave transmitted through the optical waveguide is radiated in the direction significantly perpendicular to the circuit plane.

The optical resonance mechanism may have a hole having a shape and a size by which resonance with a lightwave transmitted through the optical waveguide occurs, and a resonant portion which surrounds the hole.

It is also possible that:

an optical device is formed in one of the base layer and the photonic crystal layers, and a first optical waveguide is formed in the circuit plane of the optical device;

a second optical waveguide is formed in one of the remaining base layer and photonic crystal layers and the second optical waveguide is close to an end portion of the first optical waveguide; and the mechanism for transmitting and receiving an optical signal between the optical devices inputs a lightwave from the first optical waveguide to the second optical waveguide, and is a mode converter for converting a lightwave in a manner such that a lightwave, which is transmitted along the first optical waveguide, leaks at the end portion of the first optical waveguide, and the leaked lightwave is input into the second optical waveguide.

In this case, the mode converter may include the end portion of the first optical waveguide and the second optical waveguide, where the end portion has a tapered shape in which the thickness gradually decreases towards a head point.

According to the mechanism for transmitting and receiving an optical signal between the optical devices, optical signals can be transmitted between different layers of the photonic crystal multilayer substrate.

The present invention also provides a method of manufacturing a photonic crystal multilayer substrate, comprising the steps of:

forming a cladding layer on a first substrate;

forming a photonic crystal layer on the cladding layer, where the photonic crystal layer is used for forming a lightwave circuit;

producing a first wafer by forming a lightwave circuit in the photonic crystal layer, where the lightwave circuit is assigned to a first layer of the photonic crystal multilayer substrate;

producing a second wafer by forming a cladding layer on a second substrate and forming a photonic crystal layer on this cladding layer;

producing a composite wafer by putting the first and second wafers together in a manner such that the photonic crystal layer of the first wafer adheres with the cladding layer of the second wafer;

removing the substrate portion of the second wafer from the composite wafer;

forming a lightwave circuit in the photonic crystal layer which is exposed after the removal of the substrate portion of the second wafer, where this lightwave circuit is assigned to a second layer of the photonic crystal multilayer substrate; and forming a multilayered lightwave circuit in the photonic crystal layers by repeating the above steps.

According to this method, a photonic crystal multilayer substrate having a desired structure including multiple layers can be manufactured.

BRIEF DESCRIPTION OF THE DRAWINGS

FIG. 3A is a perspective view, FIG. 3B is a partial sectional view showing an example of the structure of the cladding layer made of a one-dimensional photonic crystal, and FIG. 3C is a partial sectional view showing another example of the structure of the cladding layer made of a two-dimensional photonic crystal.

FIG. 5A is a cross sectional view of a portion of the photonic crystal multilayer substrate, while FIG. 5B is a perspective view of the photonic crystal multilayer substrate.

FIG. 6A is a cross sectional view of a portion of the photonic crystal multilayer substrate, while FIG. 6B is a perspective view of the photonic crystal multilayer substrate.

DESCRIPTION OF THE PREFERRED EMBODIMENTS

Hereinafter, embodiments according to the present invention will be explained in detail with reference to the drawings in order to clearly show the above and other objects, distinctive features, and effects of the present invention.

Below, the structure and manufacturing method of a slab-waveguide type photonic crystal multilayer substrate as an embodiment of the present invention will be explained. In addition, a method of forming a multilayered lightwave circuit or a multilayered optical wiring in the multilayer substrate will also be explained.

Figure 1:
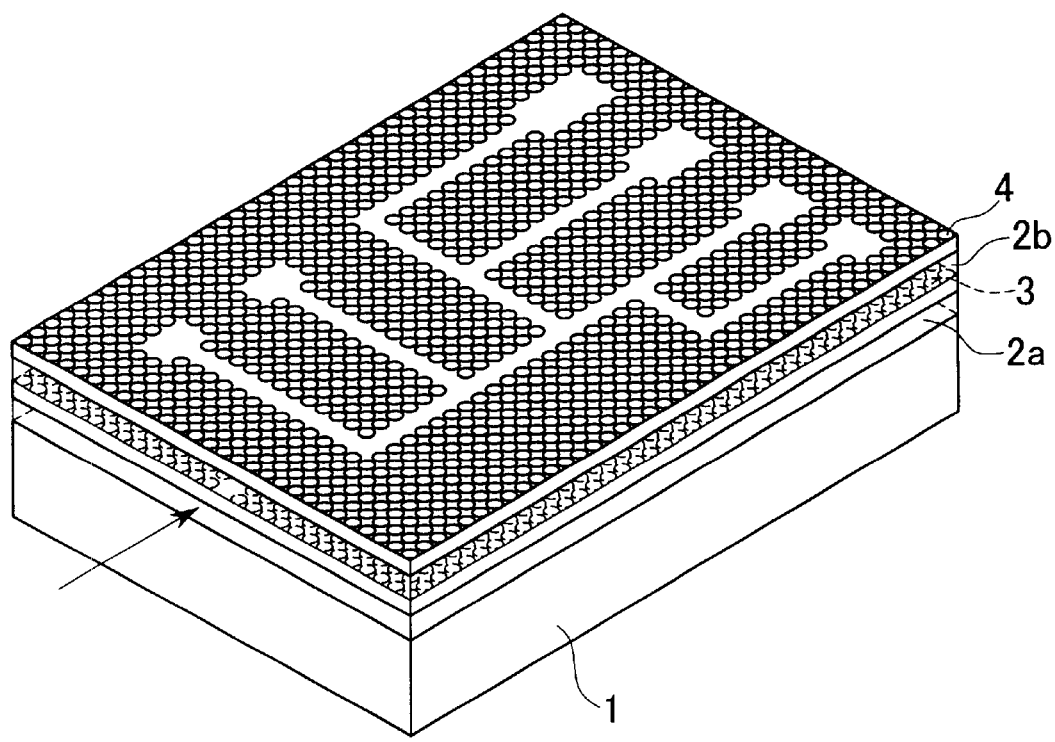
FIG. 1 is a perspective view showing an embodiment of the photonic crystal multilayer substrate according to the present invention.

FIG. 1 is a perspective view showing the slab-waveguide type photonic crystal multilayer substrate of the present embodiment. FIG. 1 shows a two-layered photonic crystal multilayer substrate as an example; however, the present invention can similarly be applied to a structure with three or more layers.

In the photonic crystal multilayer substrate of FIG. 1, the following layers are formed in turn from the bottom: (i) a first $SiO_2$ cladding layer 2a on a substrate 1 made of Si, (ii) a first photonic crystal layer 3, made of Si, in which a lightwave circuit for the first layer is formed, (iii) a second $SiO_2$ cladding layer 2b, and (iv) a second photonic crystal layer 4, made of Si, in which a lightwave circuit for the second layer is formed.

The photonic crystal layer 3 including a lightwave circuit in FIG. 1 has a slab waveguide structure in the direction of its thickness. Due to the structure, lightwaves can be confined in the photonic crystal layer 3 between the cladding layers 2a and 2b, thereby suppressing interference (i.e., crosstalk) between the lightwave circuits of each photonic crystal layer.

In addition, in the photonic crystal multilayer substrate, the slab waveguide structure whose core is the second photonic crystal layer 4 and the slab waveguide structure whose core is the first photonic crystal layer 3, these slab waveguides being adjacent to each other, use a common cladding layer, that is, the second $SiO_2$ cladding layer.

In order to form a slab waveguide structure, preferably, the effective refractive indexes of the cladding layers 2a and 2b are smaller than those of the photonic crystal layers 3 and 4.

That is, preferably, the effective refractive index of the material of which the cladding layers 2a and 2b are made (i.e., the refractive index of $SiO_2$: 1.5), is smaller than the effective refractive index of the photonic crystal layers 3 and 4 which function as cores (i.e., almost the volume average of the refractive indexes of Si and air).

Below, the method of manufacturing the photonic crystal multilayer substrate in the present embodiment (as shown in FIG. 1) will be explained with reference to FIGS. 2A to 2D. More specifically, FIGS. 2A to 2D show cross-sectional structures for explaining the process of manufacturing a multilayered optical integrated circuit in the present embodiment.

Figure 2C:
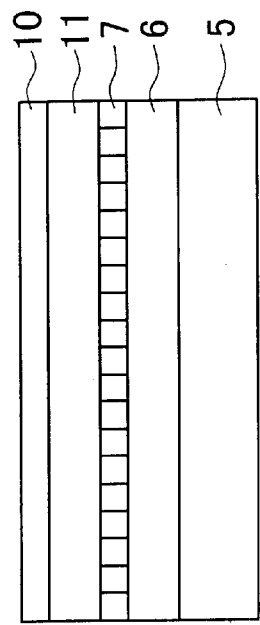
FIGS. 2A to 2D show cross-sectional structures for explaining the process of manufacturing a multilayered optical integrated circuit according to the present invention.
Figure 2D:
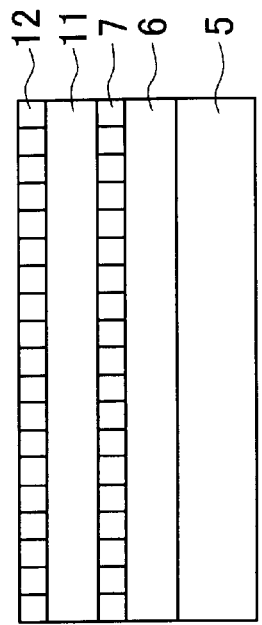
Figure 2A:
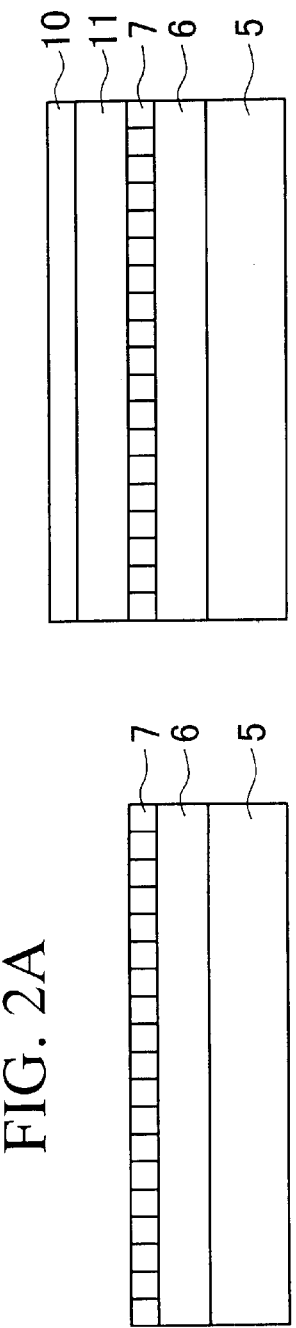

First, as shown in FIG. 2A, an SOI (silicon on insulator) wafer is made in which an $SiO_2$ cladding layer 6 having a thickness of approximately 2 $\mu$m is formed on an Si substrate 5 (corresponding to the first substrate of the present invention), and an Si layer having a thickness of approximately 1 $\mu$m is further formed on the $SiO_2$ cladding layer 6.

Thereafter, a photonic crystal layer 7 is formed by providing holes which are regularly and periodically arranged on the above-described Si layer, and a lightwave circuit for the first layer is formed in the photonic crystal layer 7, so that the first wafer is manufactured.

In order to form the above-described lightwave circuit, the following methods may be used: (i) in the first method, when the top Si layer is processed to form the photonic crystal layer 7, a circuit pattern is formed, in advance, in a mask used for crystal-pattern processing, and (ii) in the second method, a uniform photonic crystal layer 7 is first formed, and then a circuit pattern is formed using an etching or embedding method, or the like.

Figure 2B:
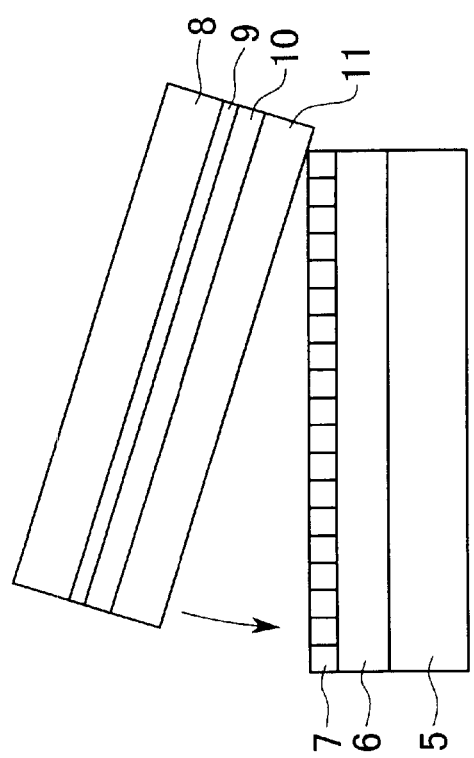

In the next step, as shown in FIG. 2B, the second wafer is manufactured, which includes (i) an $SiO_2$ layer 9 having a thickness of approximately 0.2 $\mu$m formed on an Si substrate 8 (corresponding to the second substrate of the present invention), and (ii) an Si layer 10 having a thickness of approximately 1 $\mu$m formed thereon, and (iii) an $SiO_2$ layer 11 having a thickness of approximately 2 $\mu$m formed thereon.

The composite wafer is formed by putting the second wafer on the first wafer (that is, both wafers are adhered to each other). Here, the photonic crystal layer 7 of the first wafer and the $SiO_2$ layer 11 of the second wafer are made to face each other.

The adherent condition between the first and second wafers can be realized using an already-established technique such as thermocompression bonding.

In the next step, the Si substrate 8 and the $SiO_2$ layer 9 having a thickness of approximately 0.2 $\mu$m, both belonging to the composite wafer, are removed by using the etching, as shown in FIG. 2C, so as to expose the Si layer 10.

In the next step, as shown in FIG. 2D, the exposed Si layer 10 is processed so as to form a photonic crystal layer 12 by using the above-explained method (of forming a photonic crystal layer (7)), so that a lightwave circuit for the second layer is formed in the photonic crystal layer 12. The lightwave circuit can also be formed by using the above-explained method (of forming a lightwave circuit).

By repeating the process from the step as shown by FIG. 2B to the step as shown by FIG. 2D, lightwave circuits can be multiply layered on an Si substrate.

Here, the optical interference between adjacent lightwave circuits can be suppressed to a certain degree because in the present slab waveguide structure, a photonic crystal layer is positioned between cladding layers. However, in order to completely suppress optical interference, each cladding layer between the circuits is preferably made of a photonic crystal having a photonic band gap.

Figure 3A:
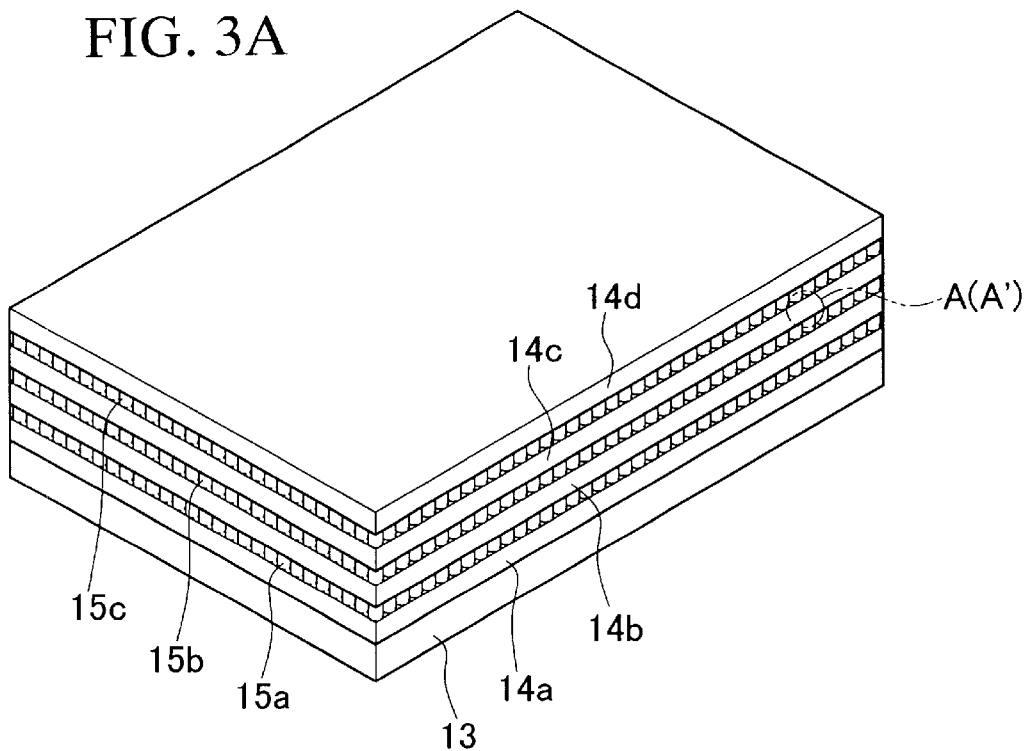
FIGS. 3A to 3C are diagrams showing the structure of a photonic crystal multilayer substrate having cladding layers made of a three-dimensional photonic crystal, as another embodiment according to the present invention.
Figure 3B:
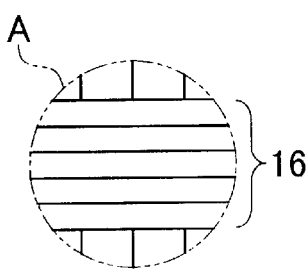
Figure 3C:
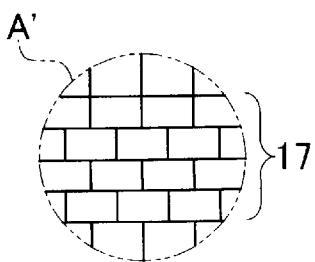

FIGS. 3A to 3C are diagrams showing the structure of a photonic crystal multilayer substrate as another embodiment according to the present invention. FIG. 3A is a perspective view showing the photonic crystal multilayer substrate of the present embodiment, FIG. 3B is a partial sectional view showing an example of the structure of the cladding layer, and FIG. 3C is a partial sectional view showing another example of the structure of the cladding layer.

As shown in FIG. 3A, the photonic crystal multilayer substrate of the present embodiment includes the following layers formed in turn on a substrate: (i) a cladding layer 14a, (ii) a photonic crystal layer 15a, (iii) a cladding layer 14b, (iv) a photonic crystal layer 15b, (v) a cladding layer 14c, (vi) a photonic crystal layer 15c, and (vii) a cladding layer 14d. In addition, the photonic crystal multilayer substrate of the present embodiment is formed using the above-explained method of manufacturing a photonic crystal multilayer substrate.

In the present embodiment, preferably, the photonic crystal for forming the cladding layers 14a to 14d has a three-dimensional photonic crystal structure having a complete band gap in the wavelength range of lightwaves introduced into the relevant lightwave circuit. However, a one-dimensional photonic crystal 16 (i.e., a multilayered film) as shown in FIG. 3B, or a two-dimensional photonic crystal 17 as shown in FIG. 3C may be used.

If the one-dimensional photonic crystal (i.e., multilayer film) 16 is used, the thickness of the film is determined under the condition that the condition of the Bragg reflection is satisfied with respect to light which is incident on the multilayer film in the direction significantly perpendicular to the film.

Below, each expression "perpendicular to" basically means "significantly perpendicular to".

In the above-explained embodiments, Si and $SiO_2$ are used as materials deposited on an Si substrate, that is, Si and $SiO_2$ are respectively used for forming a photonic crystal layer and a cladding layer. However, a similar structure can be applied when a layer made of an AlGaAs material is formed on a GaAs substrate, or when a layer made of an InGaAsP material is formed on an InP substrate.

Next, a method for realizing transmission of an optical signal between lightwave circuits formed in each photonic crystal layer of a photonic crystal multilayer substrate will be explained with reference to FIGS. 4 to 6B.

According to the present invention, a multilayered photonic crystal substrate can be realized by employing the structure as shown in FIG. 1 and by using the manufacturing method explained referring to FIGS. 2A to 2D. In addition, a structure having a mechanism for transmitting (and receiving) an optical signal between lightwave circuits of each photonic crystal layer, or a structure having a mechanism for transmitting (and receiving) an optical signal between layers in which lightwave circuits are multilayered is possible.

Figure 4:
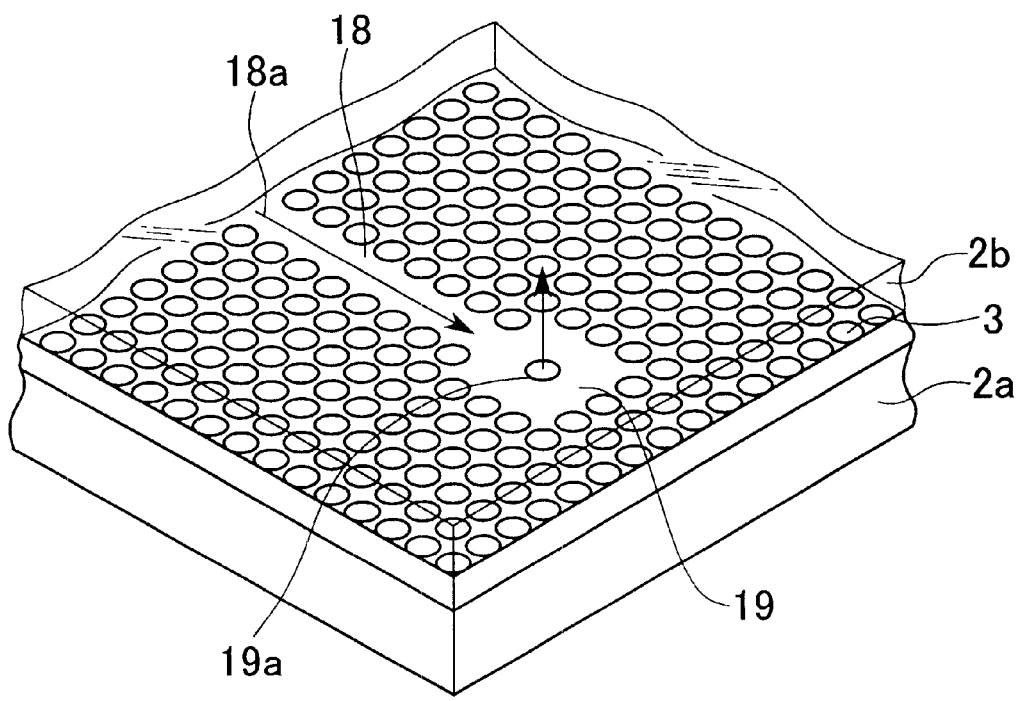
FIG. 4 is a perspective view showing an example of the structure of a mode converter provided in a photonic crystal multilayer substrate according to the present invention.

FIG. 4 shows an example of the structure of a mode converter for performing optical signal transmission or optical connection between layers. FIG. 4 is a perspective view showing an enlarged structure of the mode converter formed in the photonic crystal layer 3 of the photonic crystal multilayer substrate in FIG. 1.

The photonic crystal layer 3 between the cladding layers 2a and 2b in the mode converter shown in FIG. 4 has (i) a hole 19a having a shape and a size by which resonance occurs for the wavelength of a lightwave (i.e., optical signal) 18a transmitted through an optical waveguide 18, and (ii) a resonant portion (no-hole portion) 19 which surrounds the hole 19a. This resonant portion 19 is connected to an end of an optical waveguide 18a in the same plane.

According to the converting function of the mode converter, a lightwave 18 transmitted along the optical waveguide 18 in the circuit plane of the photonic crystal layer 3 is output in the direction perpendicular to the circuit plane, or a lightwave incident on the circuit plane in the direction perpendicular to the circuit plane is transmitted along the optical waveguide 18 in the circuit plane.

In the present mode converter, the resonance wavelength can be changed depending on the size and shape of the hole 19a provided at the center of the resonant portion 19. Therefore, the size and shape of the hole 19a are determined according to the wavelength of the lightwave 18a introduced into the optical waveguide 18, thereby realizing the optical signal transmission (and reception) suitable for the employed lightwave 18a.

In addition, in optical wiring formed in each of different photonic crystal layers of a photonic crystal multilayer substrate, if two mode converters, as explained above, are provided at positions between which optical signal transmission (i.e., optical connection) is desired, in a manner such that the mode converters face each other, then the optical signal transmission between layers is realized.

The transmission (and reception) of an optical signal is performed according to the function (or operation) explained below.

For example, a lightwave transmitted along the optical waveguide in the circuit plane of the lightwave circuit formed in the first photonic crystal layer is output in the direction perpendicular to the circuit plane by using the first mode converter, so as to obtain the converted lightwave which is incident on the second photonic crystal layer in the direction perpendicular to the layer.

In the next step, the above lightwave incident on the second photonic crystal layer in the direction perpendicular to the circuit plane of the second photonic crystal layer is introduced into the optical waveguide of the second photonic crystal layer, by using the second mode converter which faces the first mode converter.

In this way, the lightwave transmitted in the circuit plane of the first photonic crystal layer can be guided into the circuit plane of the second photonic crystal layer.

Figure 5A:
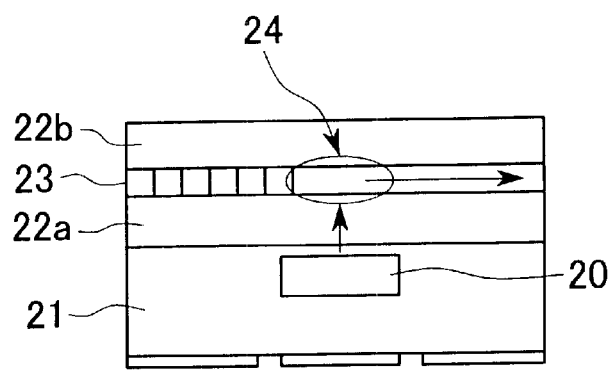
FIGS. 5A and 5B show an embodiment of the photonic crystal multilayer substrate of the present invention, where the photonic crystal multilayer substrate comprises a mode converter used together with the VCSEL.
Figure 5B:
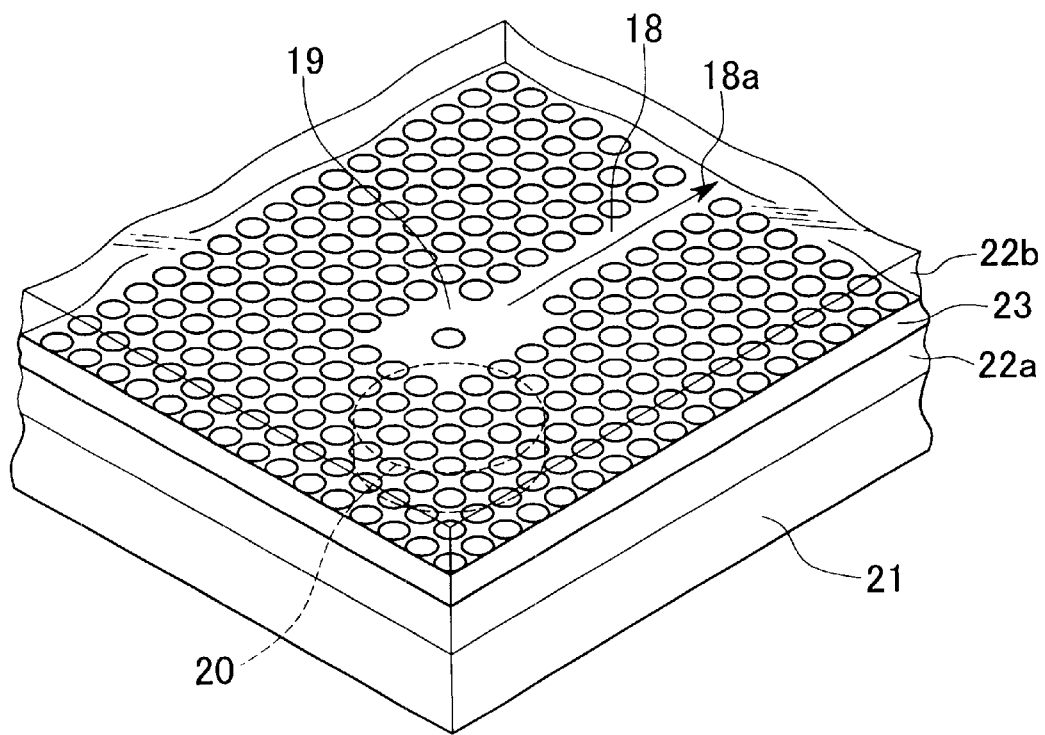

The mode converters which operate as explained above can be used accompanied with a vertical cavity surface emitting laser (VCSEL). FIGS. 5A and 5B show an embodiment of the photonic crystal multilayer substrate of the present invention, where the photonic crystal multilayer substrate comprises a mode converter used together with the VCSEL. FIG. 5A is a cross sectional view of a portion of the photonic crystal multilayer substrate, while FIG. 5B is a perspective view of the photonic crystal multilayer substrate.

In FIG. 5A, the photonic crystal multilayer substrate of the present embodiment has the following layers formed in turn on an InP device-forming layer 21 (corresponding to the base layer of the present invention) which includes a VCSEL 20: (i) an $SiO_2$ cladding layer 22a, (ii) a photonic crystal layer 23 in which a lightwave circuit including a mode converter 24 is formed, and (iii) an $SiO_2$ cladding layer 22b.

In the photonic crystal multilayer substrate as shown in FIGS. 5A and 5B, light emitted from the VCSEL 20 is incident on the mode converter 24 in the direction perpendicular to the circuit plane, and the mode converter 24 operates so as to introduce the incident lightwave into the optical waveguide 18 formed in the circuit plane.

Instead of the VCSEL 20, a plane-input type photodetector may be provided in the substrate 21. In this case, according to the mode converter 24, a lightwave transmitted along the optical waveguide 18 is output in the direction perpendicular to the relevant plane and can also be introduced into the plane-input type photodetector.

In addition, the mode converter may have a structure for introducing light emitted from a planar-type semiconductor laser or a light emitting element into an optical waveguide in the relevant circuit, or for introducing light output from an optical waveguide into a device such as a planar-type light detecting element or the like.

Figure 6A:
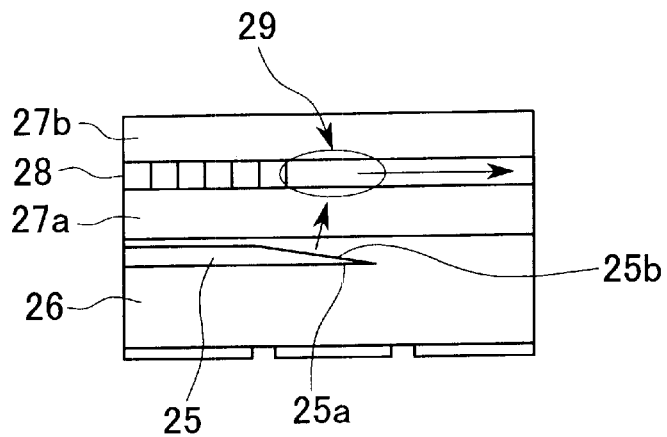
FIGS. 6A and 6B show an embodiment of the photonic crystal multilayer substrate of the present invention, which comprises a planar-type semiconductor laser and a mode converter.
Figure 6B:
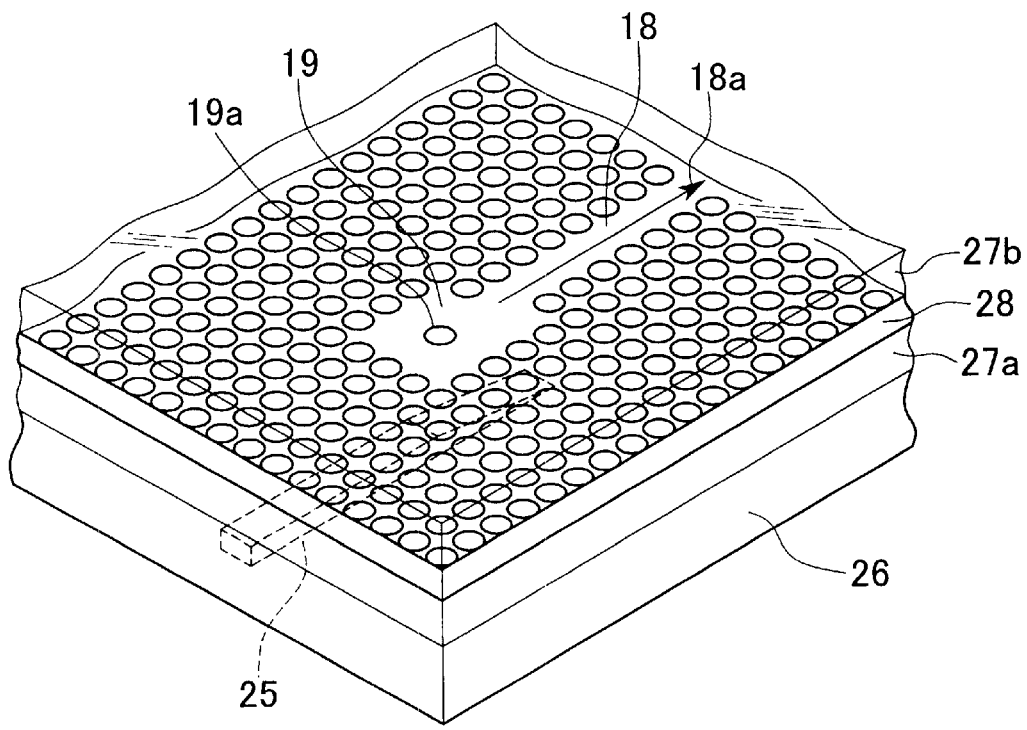

Below, the above-described structure and function will be explained in detail, with reference to FIGS. 6A and 6B. FIGS. 6A and 6B show an embodiment of the photonic crystal multilayer substrate of the present invention, which comprises a mechanism for introducing a lightwave from a planar-type optical device into an optical waveguide in the circuit plane of a photonic crystal layer. FIG. 6A is a cross sectional view of a portion of the photonic crystal multilayer substrate, while FIG. 6B is a perspective view of the photonic crystal multilayer substrate.

The photonic crystal multilayer substrate of the present embodiment as shown in FIGS. 6A and 6B has the following layers formed in turn on an InP device-forming layer 26 (corresponding to the base layer of the present invention) which includes a planar-type semiconductor laser 25: (i) an $SiO_2$ cladding layer 27a, (ii) a photonic crystal layer 28 in which a mode converter 29 and a lightwave circuit are formed, and (iii) an $SiO_2$ cladding layer 27b.

Here, the mode converter 29 is positioned in the photonic crystal layer 28 in a manner such that the mode converter 29 faces the head portion 25a of the planar-type semiconductor laser 25.

In the photonic crystal multilayer substrate as shown in FIGS. 6A and 6B, portions of two waveguides are optically coupled with each other, thereby transmitting and receiving lightwaves between different layers.

The head portion 25a of the planar-type semiconductor laser 25 shown in FIG. 6A has a tapered optical waveguide whose thickness gradually decreases towards the head point. Such a tapered optical waveguide has characteristics in which lightwaves leak out and are emitted from the waveguide. Therefore, a lightwave is emitted from the planar-type semiconductor laser 25 in a direction almost perpendicular to the taper face 25b of the head portion 25a.

Here, in the photonic crystal layer 28, an optical waveguide is formed in a manner such that the optical waveguide faces the taper face 25b of the head portion 25a. Therefore, the leaked light from the planar-type semiconductor laser 25 is introduced into the optical waveguide and is converted into a lightwave transmitted in the circuit plane of the photonic crystal layer 28.

According to the above-explained function, light output from the planar-type semiconductor laser can be input into the optical waveguide.

The present invention is not limited to the above-explained embodiments, and any modification is possible within the scope and spirit of the present invention.

What is claimed is:

1. A photonic crystal multilayer substrate having portions, each portion having a photonic crystal structure, multilayered in the direction of the thickness of the substrate, wherein in the photonic crystal structure:
    a photonic crystal layer is disposed between cladding layers;
    the photonic crystal layer is made of a photonic crystal having a two or three dimensional periodically modulated structure with respect to the effective refractive index in the order of optical wavelengths; and
    each cladding layer is made of a material whose effective refractive index differs from the effective refractive index of the photonic crystal layer.

2. A photonic crystal multilayer substrate as claimed in claim 1, wherein the effective refractive index of the material of each cladding layer is smaller than an effective refractive index of the photonic crystal layer.

3. A photonic crystal multilayer substrate as claimed in claim 2, wherein a multilayered lightwave circuit is formed by forming optical devices in the photonic crystal layers.

4. A photonic crystal multilayer substrate as claimed in claim 1, wherein each cladding layer has a multilayered film in which two or more kinds of materials having different effective refractive indexes are alternately layered.

5. A photonic crystal multilayer substrate as claimed in claim 4, wherein the multilayered film for forming the cladding layer has optical reflective characteristics in which the reflectance with respect to a lightwave having a specific wavelength is larger than the reflectance with respect to other lightwaves.

6. A photonic crystal multilayer substrate as claimed in claim 5, wherein in the optical reflective characteristics of the multilayered film, the reflectance with respect to a lightwave introduced into an optical device formed in the multilayer substrate is larger than the reflectance with respect to other lightwaves.

7. A photonic crystal multilayer substrate as claimed in claim 1, wherein each cladding layer is made of a photonic crystal having a two or three dimensional periodically modulated structure with respect to the effective refractive index.

8. A photonic crystal multilayer substrate as claimed in claim 7, wherein the photonic crystal for forming the cladding layer has optical reflective characteristics in which the reflectance with respect to a lightwave having a specific wavelength is larger than the reflectance with respect to other lightwaves.

9. A photonic crystal multilayer substrate as claimed in claim 8, wherein in the optical reflective characteristics of the photonic crystal, the reflectance with respect to a lightwave introduced into an optical device formed in the multilayer substrate is larger than the reflectance with respect to other lightwaves.

10. A photonic crystal multilayer substrate as claimed in any one of claims 3 to 9, including:
    a base layer on which the portions having the slab-waveguide type photonic crystal structure are formed;
    optical devices formed in at least two layers among the base layer and the photonic crystal layers; and
    a mechanism for transmitting and receiving an optical signal between the optical devices of each layer.

11. A photonic crystal multilayer substrate as claimed in claim 10, wherein:
    an optical device is formed in one of the base layer and the photonic crystal layers, and an optical waveguide is formed in the circuit plane of the optical device; and
    the mechanism for transmitting and receiving an optical signal between the optical devices is a mode converter for converting a lightwave in a manner such that a lightwave, which is transmitted along the optical waveguide, is radiated in the direction significantly perpendicular to the circuit plane, or a lightwave incident on the circuit plane in the direction significantly perpendicular to the circuit plane is transmitted along the optical waveguide.

12. A photonic crystal multilayer substrate as claimed in claim 11, wherein the mode converter has an optical resonance mechanism, formed at an end portion of the optical waveguide in the circuit plane of the optical device, by which resonance for a lightwave with a certain wavelength transmitted through the optical waveguide occurs, and the lightwave transmitted through the optical waveguide is radiated in the direction significantly perpendicular to the circuit plane.

13. A photonic crystal multilayer substrate as claimed in claim 12, wherein the optical resonance mechanism has a hole having a shape and a size by which resonance with a lightwave transmitted through the optical waveguide occurs, and a resonant portion which surrounds the hole.

14. A photonic crystal multilayer substrate as claimed in claim 10, wherein:
    an optical device is formed in one of the base layer and the photonic crystal layers, and a first optical waveguide is formed in the circuit plane of the optical device;
    a second optical waveguide is formed in one of the remaining base layer and photonic crystal layers and the second optical waveguide is close to an end portion of the first optical waveguide; and
    the mechanism for transmitting and receiving an optical signal between the optical devices inputs a lightwave from the first optical waveguide to the second optical waveguide, and is a mode converter for converting a lightwave in a manner such that a lightwave, which is transmitted along the first optical waveguide, leaks at the end portion of the first optical waveguide, and the leaked lightwave is input into the second optical waveguide.

15. A photonic crystal multilayer substrate as claimed in claim 14, wherein the mode converter includes the end portion of the first optical waveguide and the second optical waveguide, where the end portion has a tapered shape in which the thickness gradually decreases towards a head point.

16. A method of manufacturing a photonic crystal multilayer substrate, comprising the steps of:
    forming a cladding layer on a first substrate;
    forming a photonic crystal layer on the cladding layer, where the photonic crystal layer is used for forming a lightwave circuit;

producing a first wafer by forming a lightwave circuit in the photonic crystal layer, where the lightwave circuit is assigned to a first layer of the photonic crystal multilayer substrate;

producing a second wafer by forming a cladding layer on a second substrate and forming a photonic crystal layer on this cladding layer;

producing a composite wafer by putting the first and second wafers together in a manner such that the photonic crystal layer of the first wafer adheres with the cladding layer of the second wafer;

removing the substrate portion of the second wafer from the composite wafer;

forming a lightwave circuit in the photonic crystal layer which is exposed after the removal of the substrate portion of the second wafer, where this lightwave circuit is assigned to a second layer of the photonic crystal multilayer substrate; and forming a multilayered lightwave circuit in the photonic crystal layers by repeating the above steps.

* * * * *